(12) United States Patent
Glazko

(10) Patent No.: US 6,445,908 B1
(45) Date of Patent: Sep. 3, 2002

(54) DYNAMIC TEMPERATURE COMPENSATION AND STAGE SELECTION IN PILOT SIGNAL ACQUISITION

(75) Inventor: Serguei A. Glazko, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/420,312

(22) Filed: Oct. 18, 1999

(51) Int. Cl.⁷ .................................................. H04B 1/06
(52) U.S. Cl. ................. 455/255; 455/196.1; 455/161.1; 455/259
(58) Field of Search .............................. 455/434, 515, 455/161.1, 161.2, 196.1, 255, 256, 257, 258, 259; 331/176, 175, 214

(56) References Cited

U.S. PATENT DOCUMENTS

| | | | | |
|---|---|---|---|---|
| 5,740,525 A | * | 4/1998 | Spears | 455/259 |
| 5,875,388 A | | 2/1999 | Daughtry, Jr. et al. | 455/67.1 |
| 6,026,301 A | * | 2/2000 | Satarasinghe | 455/436 |
| 6,148,187 A | * | 11/2000 | Chiba | 455/192.2 |
| 6,215,990 B1 | * | 4/2001 | Kidd | 455/255 |

FOREIGN PATENT DOCUMENTS

| | | |
|---|---|---|
| DE | 37 35 011 A1 | 4/1989 |
| WO | WO 98/32221 | 7/1998 |

\* cited by examiner

Primary Examiner—Vivian Chin
Assistant Examiner—John J Lee
(74) Attorney, Agent, or Firm—Philip R. Wadsworth; Charles D. Brown; George C. Pappas

(57) ABSTRACT

A method and apparatus for dynamic temperature compensation and pilot stage searcher selection in a mobile unit of a CDMA wireless communication link. Temperature values and measured pilot frequencies are stored in a Temperature Compensation Table and a Temperature Array. The dynamically updated frequency values maintained in the Temperature Compensation Table and Temperature Array are used to determine the searcher stage to be used in pilot signal acquisition. Both the Temperature Compensation Table and the Temperature Array (TA) are updated every 30 seconds after the mobile unit has acquired a pilot signal. The values in the Temperature Array correspond only to values measured during the current phone power on cycle. If the mobile unit loses acquisition with a pilot signal and must reacquire, the acquisition software examines the TA values to determine whether or not the current temperature is saved in the TA. If the current temperature is saved in the TA then a recent frequency estimate exists and the pilot acquisition software uses the frequency estimate and utilizes a fast searcher algorithm. If the current temperature is within a predetermined threshold of the values saved in the TA, the pilot acquisition software calculates a weighted estimate of the frequency based upon the values saved in the TA and values previously saved in the Temperature Compensation Table. The acquisition software then makes a decision of which searcher stage to be used based upon the weighted frequency estimate.

8 Claims, 2 Drawing Sheets

DYNAMIC TEMPERATURE COMPENSATION AND STAGE SELECTION IN PILOT SIGNAL ACQUISITION

BACKGROUND OF THE INVENTION

1. Field of the Invention

This invention relates generally to the field of mobile telephones, and more specifically pertains to pilot signal acquisition.

2. Description of Related Art

A Code Division Multiple Access (CDMA) digital communication system uses a special class of binary sequences with good correlation properties to identify and distinguish between the multiple mobile telephone units and base stations (BS). Pseudo noise (PN) binary sequences are used to synchronize the mobile unit to the base station signal. The pilot signal from each base station is uniquely identified by a different PN code offset.

The initial task of a mobile unit is to acquire the pilot signal transmitted by the base station for synchronization purposes. The pilot signal for a given base station is identified by a unique value of the PN code offset Tn, and the mobile telephone unit's demodulator module is supplied with the value of this PN code offset. Only after successful pilot signal acquisition can the mobile unit register with the base station and initiate and receive calls. The PN code offset as perceived by the mobile unit is a function of the base station PN code offset Tn, fixed for that base station, and the mobile unit's distance from the base station, called the signal path. Therefore, the PN code offset value is fixed at a given base station but will vary as perceived by the mobile unit as the mobile unit's physical location and assigned base station changes with time.

The pilot signal acquisition is a major task and is performed by the searcher block hardware 10 of the Mobile Station Modem (MSM) chip 5. FIG. 1 is a simplified block-diagram of an MSM chip depicting only the pilot acquisition elements. The electromagnetic input signal received by the mobile unit is downconverted and input to the pilot searcher. The downconverted signal input to the pilot searcher is a combination of a) a data part D(n-Tn), b) a PN code part C(n-Tn); and c) a residual carrier part $Cos(\omega_e*n)$. The residual carrier part $Cos(\omega_e*n)$ is the result of frequency error in the mobile unit local oscillator. The frequency error is the local oscillator's deviation from its intended normal frequency. It is desirable that the local oscillator frequency matches the base station frequency. The frequency error in the mobile unit local oscillator changes with temperature and age. The received pilot input signal is also offset by N (n), which is a Gaussian noise and interference function that makes the signal-to-noise ratio finite. The optimization of the N (n) offset requires utilization of some searching techniques to determine the optimized search parameters.

The searcher block 10 of the MSM chip 5 processes the incoming electromagnetic input signal and tries to determine the PN code offset Tn to be reported to the demodulator module 20. If the PN code offset Tn is determined properly, the mobile unit can successfully acquire control channels from the base station and establish forward and reverse links for synchronization purposes.

Typically, the pilot signal acquisition is performed using expensive temperature correcting hardware modules 30 to minimize frequency error. The hardware performs temperature compensation of some search parameters. The searcher block's pilot signal acquisition task is non-dynamic with respect to most recent temperature values, and although it may use a fixed frequency estimation versus temperature table, it does not attempt to update current temperature and frequency values.

In another approach, the searcher block 10 uses a non-dynamic pilot signal acquisition task (i.e. "process") comprising software, embedded in a microprocessor 40, also part of the MSM chip 5, with a searcher algorithm which chooses the particular search parameters and performs scheduling of the particular search sequence. The initial part of the pilot signal acquisition task consists of examining all possible PN code offsets Tn of the PN code part C(n) that possess good correlation properties. The search sequence is performed by the searcher software in the searcher block 10 hardware of the MSM chip. The MSM chip iteratively performs the multiplication, correlation, summation, and truncation operations of the searcher algorithm and reports the results to the embedded software in microprocessor 40. Certain search parameters are chosen by the searcher software and programmed into registers 50 of the MSM chip 5.

The searcher software is used in the mobile telephone to control the searcher block hardware 10 inside the MSM chip to quickly acquire and track base station pilot signals. The major considerations in designing the searcher algorithm are the speed of pilot signal acquisition and the success rate in acquiring a pilot signal of reasonable strength. Therefore, the search parameters are chosen to minimize the pilot signal acquisition time and maximize the probability of pilot signal acquisition.

The major obstacles in acquiring pilot signals are noise and interference that can be measured against the signal strength by the signal-to-noise ratio Ec/No (also referred to as pilot signal strength) and the parameter $\omega_e=2\Pi Fe$. The parameter Fe is the residual frequency error, defined as the difference between the frequency of the base station pilot signal and the frequency of the mobile unit local oscillator. Each mobile unit is residual frequency error Fe is a function of temperature, age, voltage stability and the type of crystal used to build the local oscillator circuit.

The MSM chip hardware registers 50 are used to hold parameters programmable by the searcher software, such as Searcher_Gain register for G parameter, Search_Integrate_Time register for the integration length parameter Nc, Search_Acc_Passes register for the number of integration passes (Nn parameter), and Search_Num register for the sweep window size (Ws parameter). These four major parameters are the building blocks of each search stage, and different stages are the building blocks of the searcher algorithm. A stage is a particular search conducted for a pilot signal, using a given set of values for these major parameters.

The Nc parameter describes the length of coherent energy integration. Coherent integration suffers significant degradation when the residual frequency error Fe reaches a predetermined large value and the integration has to be stopped. The estimate of the effect of a frequency error on the coherent energy degradation, which is a correlation loss as a function of the residual frequency error Fe, may be described by the following equation for frequency degradation coefficient L:

$$L(Nc, Fe)=[\sin (Nc*Fe)/Nc*Fe]^2$$

Since the L function is a decreasing function dependent on Nc and Fe parameters, the presence of a larger value of the residual frequency error Fe allows use of a smaller coherent energy integration length Nc. At a certain residual frequency error Fe value the searcher software determines that the correlation value is degraded enough to significantly reduce the probability of pilot signal acquisition.

Ideally, the mobile unit should have a short acquisition time and good searcher sensitivity, which will be obtained if a low value pilot signal strength can be acquired by the mobile unit. However, there is usually a tradeoff between the two values. The total acquisition time the searcher spends searching all hypotheses is roughly on the order of Nc*Nn, where Nn is the number of integration passes of integration length Nc.

If the residual frequency error Fe is present and unknown to the searcher, the acquisition time is significantly higher than if it is known. To provide sufficient total correlation length, several (Nn) passes of integration length Nc should be made, and the energy accumulated in each coherent pass should be squared and added together to produce the total energy estimate. Since this non-coherent addition is not as effective as coherent integration against the noise and interference, reducing the Nc number by half will require more than doubling the Nn value to acquire a pilot signal of the same strength Ec/No. Thus, to shorten the long acquisition time for the unknown value of the residual frequency error Fe, the number of integration passes has to be increased to account for reduced integration length Nc.

In yet another software approach the searcher pilot signal acquisition task uses a static frequency error estimation table and there is no attempt to track recent temperature and frequency error values. There, the temperature compensation of the residual frequency error Fe is performed by a searcher task, which makes decisions about the search strategy based on the state of a hardware register state and the next hardware task is determined by the static frequency estimates.

Therefore, there is a need for an efficient architecture and method for dynamic temperature compensation and search parameter selection in order to reduce the time required for pilot signal acquisition.

SUMMARY OF THE INVENTION

The preceding and other shortcomings of prior systems are addressed and overcome by various embodiments of the present invention. The present invention is an improved method and apparatus for dynamic temperature compensation and stage selection within a pilot signal acquisition circuit.

Since it is known that frequency error Fe is a function of temperature, a dynamic Temperature Compensation Table (TCT) is maintained. The values in the TCT correspond to frequency error estimates of the local oscillator at particular temperatures. After a pilot signal is acquired this table is updated every 30 seconds. The TCT is stored in non-volatile memory. In addition to the TCT a smaller Temperature Array (TA) stored in volatile memory is used to record the most recent temperatures and frequency errors. The TA is updated at the same time the TCT is updated. However, since the TA is stored in volatile memory its contents are erased on power down and reset to zero each time the phone is powered up. Therefore, the TA holds the most recent frequency error and temperature estimates from the current phone on cycle. Since the TA holds no valuable information upon phone power up the phone must use the pilot searcher stage that is able to acquire a pilot signal without any frequency error estimate. Once the pilot is acquired a first time, updated values will be written to both the TCT and the TA. The software sets a status flag to indicate that values have been written into the TA.

If the pilot signal is subsequently lost and the phone is required to reacquire a pilot signal the acquisition software sees that the status flag has been set and that temperature and frequency error values exist in the TA. If the exact current temperature is saved in the TA the corresponding frequency error is known and a fast pilot searcher stage can be used. If the current temperature is within a predetermined range of the values saved in the TA, e.g. within two units, a weighted frequency error estimate is calculated based on the values stored in the TA and the calculated value of the frequency error at the current temperature is stored in the TCT. The software then is able to direct the phone to use a particular pilot searcher stage depending upon the results.

The foregoing and additional features and advantages of the present invention will become further apparent from the following detailed description and accompanying drawing figures that follow. In the figures and written description, numerals indicate the various features of the invention, like numerals referring to like features, throughout the drawing figures and the written description.

DETAILED DESCRIPTION OF THE INVENTION

The following description is provided to enable any person skilled in the art to make and use the invention and sets forth the best modes contemplated by the inventors of carrying out their invention. Various modifications, however, will be readily apparent to those skilled in the art, since the general principles of the present invention have been defined herein with specificity.

The following description refers to a memory table for storing values of the frequency error. Alternatively, the memory could be set to store the difference between the frequency of the local oscillator and known frequency of the base station.

The present invention pertains to an intelligent and dynamic frequency error estimation algorithm using a searcher temperature compensation table to make the intelligent decisions about frequency error and the set of parameters to be used by the MSM searcher block in order to reduce the time required for pilot signal acquisition in a CDMA or other wireless systems. Reduced pilot signal acquisition time improves the battery life and unloads other system tasks. Moreover, it eliminates use of expensive temperature correcting hardware modules and relies on a less costly software compensation approach.

A pilot signal acquisition circuit can be configured to operate using one of a number of stages. Parameters defining the pilot searcher stages are saved within memory. The different stages are configured to provide optimal pilot signal acquisition under varying conditions. One stage may be configured to provide fast pilot acquisition but only under the condition of low frequency error. Another pilot acquisition stage may be configured to provide pilot signal acquisition when the input pilot signal is weak and the frequency error is unknown. However, the design trade off is that the second pilot acquisition stage cannot acquire a pilot signal quickly. Other stages may be configured to provide intermediate levels of trade off between acquisition speed and tolerance to frequency error.

The choice of which pilot signal acquisition stage to use when establishing communications is helped by tracking and dynamically updating a frequency error table. When the frequency error is known the fast searcher stage can be used. When there is no estimate of the frequency error or the pilot signal is weak the slow searcher stage must be used. Similarly, when a reasonable frequency error estimate can be made, one of the intermediate speed searcher stages can be used.

Figure 1:
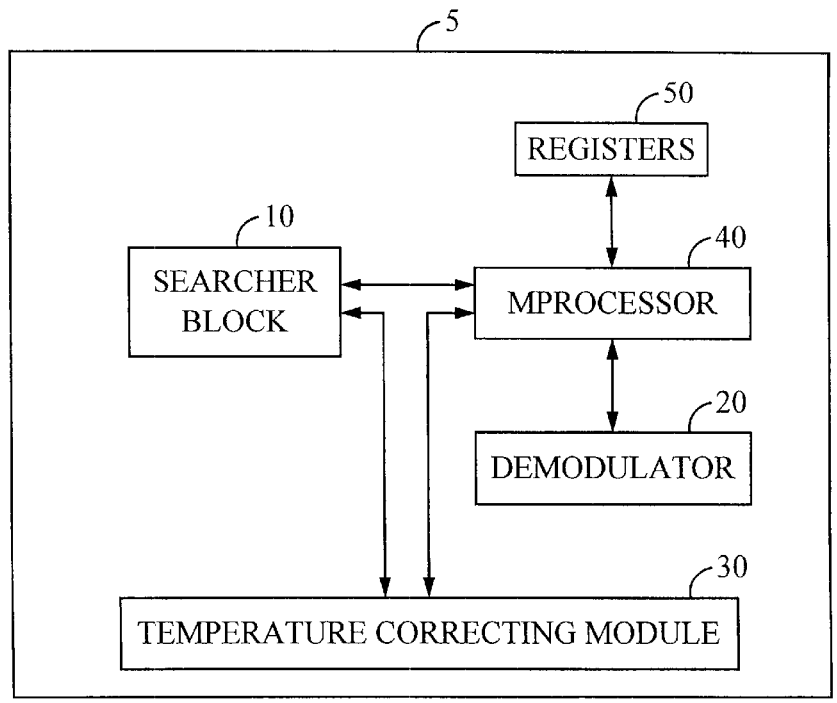
FIG. 1 illustrates a simplified block-diagram of a conventional pilot searcher within a Mobile Station Modem (MSM) chip.
Figure 2:
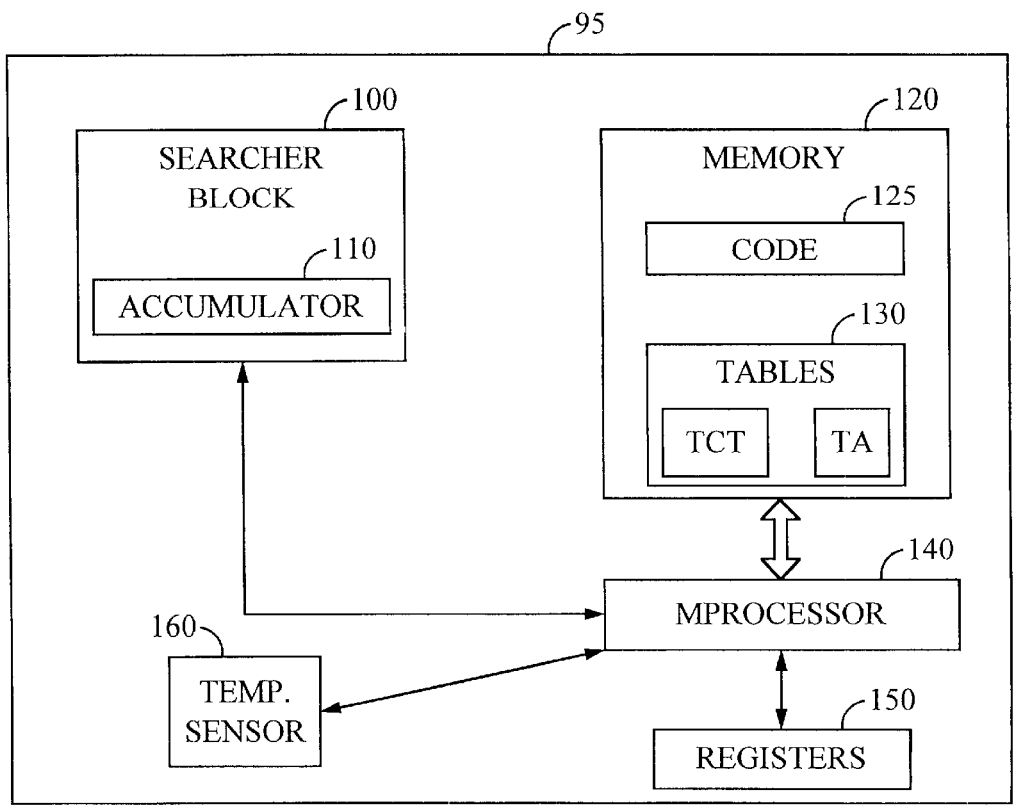
FIG. 2 illustrates a simplified block-diagram of an improved pilot searcher within an MSM chip, according to one embodiment of the present invention.

FIG. 2 illustrates a simplified block-diagram of an improved pilot searcher within an MSM chip 95, according to one embodiment of the present invention. It includes the dynamic software temperature compensation algorithm resident in microprocessor 140 for determining the residual frequency error Fe, and new searcher block 100 hardware of the improved MSM chip, which makes the searcher software and hardware run independently of the system determination tasks. The dynamic software temperature compensation algorithm provides intelligent decisions about the search strategy, based on the dynamically observed conditions.

The dynamic software temperature compensation algorithm selects parameters that define the next hardware task based on the results of the previously performed task. The algorithm keeps track of recent temperatures and corresponding frequency error values and uses the most recent values to construct an approximately optimal set of values for the searching parameters, stored in registers 150, to be used for a particular stage. The frequency error is estimated using a weighted sum of closest neighbors interpolation method.

The preferred embodiment of the present invention uses a multistage searcher algorithm to obtain the search parameter values and stage sequence. The multistage searcher algorithm is especially useful when the pilot signal strength, the residual frequency error Fe, and Ec/No value are unavailable (e.g. the pilot signal has recently been lost) and thus unknown. Because the type and number of stages to be executed in the search sequence is dynamically determined, the total probability of pilot signal detection is improved, due to the iteration of the multistage process.

Each stage is defined by the set of parameters S={Ws, Nc, Nn, G}. The Gain G parameter is not as important as the sweep window size Ws parameter. The parameter Ws determines the number of PN code offsets the searcher algorithm looks at in one sweep, before returning the results to a microprocessor 140. The total number of searched hypotheses is always fixed because each stage is a total sweep of all 32768 offsets of PN code C(n), as defined by the IS-95 protocol. The stage sensitivity and execution time are determined by the choice of Nc and Nn values. The stages are executed in sequence, until the pilot signal is acquired or an acquisition failure is declared, after all stages of a sequence have been executed. The stage sensitivity may be increased from stage to stage. Thus, the residual frequency error Fe tolerance and the acquisition time may also be increased from stage to stage.

The pilot signal acquisition process includes an initial acquisition of the pilot signal at the time the mobile unit is powered on, and re-acquisition of the pilot signal, if lost during idle mode, or during re-direction to another base station (i.e. handoff), when the mobile unit has moved too far from the previous base station. Therefore, the searcher algorithm has to be able to recognize the mobile unit mode and make an intelligent decision on the set of parameters to be used in the stage sequence, based on the available information.

The searcher algorithm is stored in a non-volatile memory 120 and it uses a Temperature Compensation Table (TCT), stored in the memory tables section 130 of memory 120. The TCT is an array, preferably having 64 elements, which gets updated regularly, preferably every 30 seconds, with the most recent frequency accumulator register 110 value on the paging or traffic channel. Thus each TCT array element value represents a frequency error estimate, corresponding to one of preferably 64 equally spaced temperature points (spaced by approximately 1.7 degrees centigrade) on the scale from −30° C. to +80° C. Thus the index into the TCT array is a temperature value, represented by the rounded temperature reading from a temperature sensor 160. Therefore, the TCT array is a frequency error learning table and frequency error estimate may improve with every new sweep.

The TCT array is stored in the non-volatile memory 120 of the mobile unit. It is updated every 30 seconds with the new value stored in the frequency accumulator register 110, corresponding to the most recent temperature reading supplied by the temperature sensor 160, every time the pilot signal is acquired and the mobile unit successfully keeps listening to a paging or traffic channel. If the mobile unit is used constantly and its internal temperature does not fluctuate, the TCT array is a good tool to provide the searcher block 100 hardware with a reliable Fe estimate, because its values are based on the temperature dependence and mobile unit aging trend. However, when the mobile unit is not used for an extended time period or if the outside temperature changes significantly, the TCT array is not completely reliable.

In an initial acquisition mode, regular stages (i.e. stages that use the non-dynamic Fe v. T tables) with good residual frequency error Fe tolerance and longer acquisition times are needed, because there is no frequency error historical knowledge and there may be a high frequency error. In re-acquisition mode, a temperature compensation algorithm is used. The temperature compensation algorithm is included in the multistage searcher algorithm and utilizes a frequency vs. temperature approach. The temperature compensation algorithm allocates a dynamic array which keeps only the most recent temperature values. Thus, the residual frequency error Fe may be reduced by watching the temperature values and their trend and choosing the appropriate stage parameters for faster pilot signal acquisition with improved sensitivity.

The elements of the TCT array T[m], have indices m=0, 1, . . . , 63, which are temperature readings from the temperature sensor 160. Each temperature sensor 160 reading value $a_i$ is preferably an 8-bit number which covers the operating temperature range of (−30° C. to +80° C.). Preferably, only the six most significant bits (MSBs) of the value $a_i$ are used to translate the temperature sensor 160 reading into the TCT array index m. Thus, the temperature resolution in the TCT is $s=2^2=4$ temperature sensor 160 units (each unit is approximately 0.43 degrees centigrade). The temperature sensor 160 scale at the ends of the operation range is preferably non-linear, and calibrated for a specific application. The frequency error estimate value stored in the TCT array that corresponds to the temperature reading $a_i$ is Fest($a_i$).

To keep track of temperature values reported by the temperature sensor 160, in order to determine the temperature change trend, while the mobile unit is on and for frequency error estimation for a new pilot signal search, a dynamic array TA[n], preferably of size 5, is introduced. It is also stored in the tables section 130 of the memory 120. It is initialized to all zero upon power on and helps keep track of the temperature changes while the mobile unit is on. It gets updated at the same time when the TCT array is updated on a paging or traffic channel. Thus, every 30 seconds a new temperature value is written into the array TA[n], if it is different from all the values already stored in the array. Since the new temperature value preferably overwrites the oldest datum in the array, the index of the most recently updated element needs to be tracked.

Figure 3:
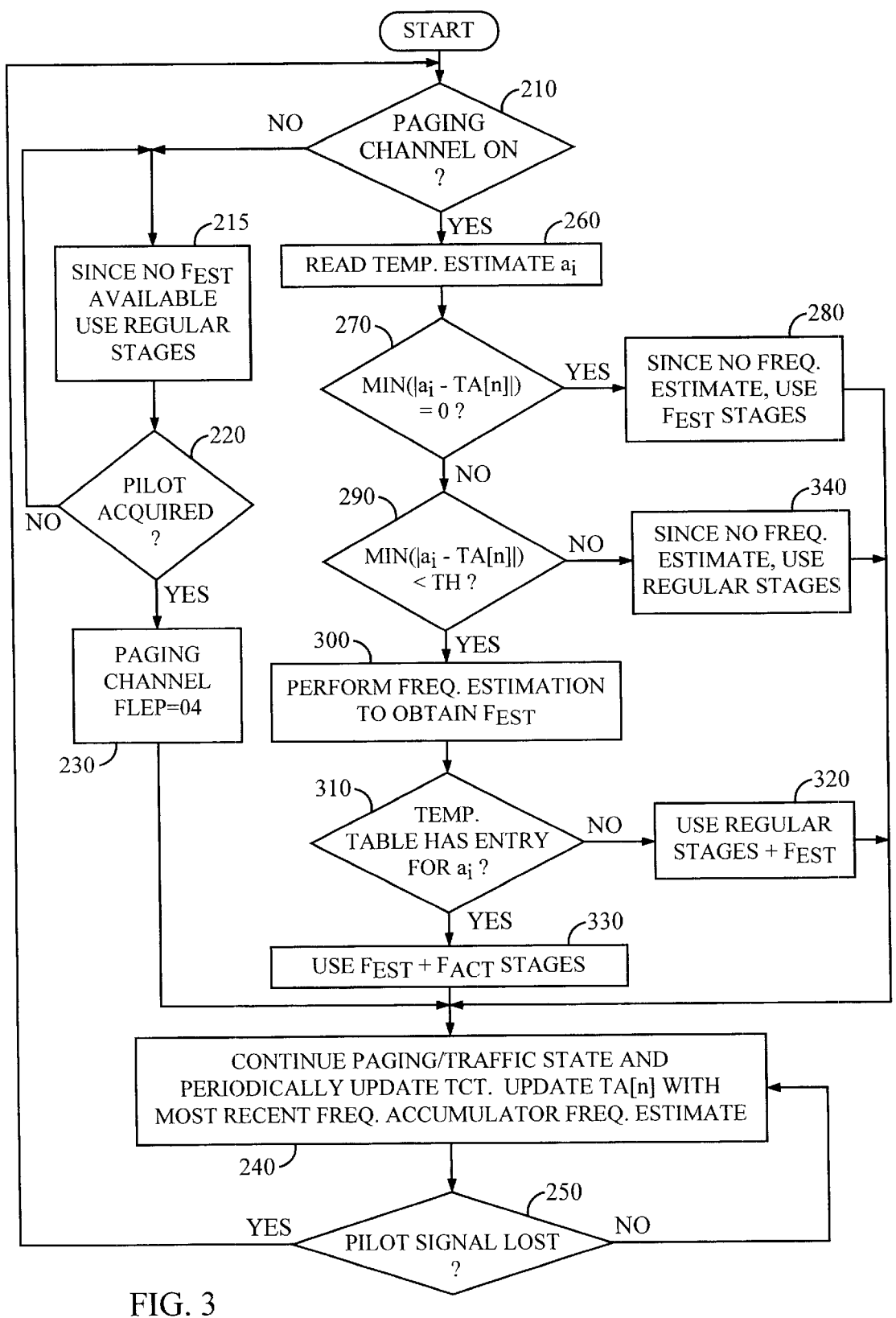
FIG. 3 illustrates a flow chart a searcher algorithm representing the method for dynamic temperature compensation and stage selection in pilot signal acquisition, according to another embodiment of the present invention.

Another embodiment of the present invention is a method for dynamic temperature compensation and stage selection in pilot signal acquisition. FIG. 3 illustrates a flow chart of the searcher algorithm. Every time the first frequency error estimate is written into the TCT array, on paging or traffic channel, a paging channel flag is set by the searcher software, to tell the searcher algorithm that there is at least one recent frequency error estimate in the TCT array and at least one non-zero value in the TA[n]. This flag is reset every time the mobile unit is powered on. Moreover, once the paging channel flag is set, the searcher algorithm needs to check the paging channel flag status every time it goes into the reacquisition mode, such as in step 210.

Upon initial power-on, since there is no frequency error estimate available, the system uses a regular stage sequence (i.e. stages that use the non-dynamic Fe v. T tables), in step 215. If the initial acquisition is successful and the pilot signal is acquired in step 220, the paging channel flag is set in step 230. Then, every 30 seconds the following steps are executed in step 240:

temperature value $a_i$ is obtained from the temperature sensor 160, temperature table is updated with the new frequency error estimate corresponding to the temperature value $a_i$, TA[n] array is updated with the value represented by the six MSB of the new temperature value $a_i$, to keep the same temperature resolution as in the TCT array, but only if it is different from any value already stored in the TA[n] array. The index n is incremented to point to the most recent updated value n=(n+1) mod n_max.

For example, at some point in time the TA[n] array has the following values TA[n]={$a_1$, $a_2$, $a_3$, 0, 0} stored in it. This indicates that, while on paging/traffic channel, the temperatures ($a_1$, $a_2$, $a_3$) were reported and corresponding frequency error estimates were updated in the TCT array.

If the system (i.e. pilot signal) is lost at this point in step 250, the searcher software starts the re-acquisition task and the following steps are taken:

the paging channel flag status is checked in step 210 and if the paging channel flag is not set, the regular stage sequence with good frequency resolution is used in step 215 and the paging channel flag is set in step 230, if the pilot signal is acquired in step 220. Then, every 30 seconds the step 240 is executed.

If the paging channel flag is found to be set in step 210, the elements of the TA[n] array are considered.

a new temperature value from the temperature sensor 160 is read in step 260, the minimum values of all the differences of $I(a_i)-TA[n]I$, where $a_i>>2$, are compared against the threshold value of 2, which represents two temperature sensor 160 units.

If the minimum values of all the differences of the fixed value of recently observed $a_i$ and all entries in the TA[n] are found to be zero in step 270, i.e., Min {$Ia_i-TA[n]I$}=0, then there is a recent frequency error estimate which can be read from the TCT array and the searcher algorithm can use a fast stage sequence with limited frequency resolution (frequency error sensitivity) in step 280.

If Min {$Ia_i-TA[n]I$}<=2 but not zero in step 290, then there is no recent frequency error estimate at that temperature, and the system will perform frequency error estimation in step 300 and average the frequency error values from the TCT corresponding to the closest temperature values recently updated in TA[n].

For this case, if the TCT array has a zero entry for this temperature, meaning that this value has never been updated, the weighted average based on the TA[n] array element distance is used, and the regular stage sequence with good frequency resolution is utilized in step 320.

For this case, if the TCT array has a non-zero entry for this temperature in step 310, the averaged values are used, but the fast stage sequence with limited frequency resolution (reduced frequency error) is executed in step 330.

If Min {$I a_i-TA[n]I$}>2 in step 290, the regular stage sequence with good frequency error resolution is utilized in step 340.

The averaging is performed in the following way, for the case where $$d_j = Ia_i - TA[n]I <= 2 \quad (1)$$

When the condition (1) is true, it means that there is at least one element in the TA[n] array that is either 1 or 2 indices distant from the $a_i$ element. The number Md of elements in the TA[n] satisfying this condition is 1, 2, 3 or 4.

A value set A is formed of all nonzero entries in the array TA[n] that satisfy the condition (1), where A={$a_1, \ldots a_j, \ldots a_{Md}$}. All corresponding distances di are computed using the equation $d_j=Ia_i-TA[n]I$ of condition (1), for every j when $0<d_j\leq 2$. The index j is independent from n in TA[n] and the order of elements in the value set A is arbitrary.

The next step includes averaging to obtain the estimate Fest to be used by the microprocessor 40 to control the oscilator 20 during the reacquisition.

$$\text{Fest} = \frac{1}{k}\text{Fest}(ai) + \sum_{j=1}^{Md} \frac{1}{djk}\text{Fest}(aj)$$

where $$k = 1 + \sum_{j=1}^{Md} \frac{1}{d_j}$$

This provides the linear weighting of the neighbors of the Fest in the TCT array, based on their distance from Fest($a_i$).

The array of recently observed temperatures TA[n] is needed to determine whether the mobile unit has a recent frequency error estimate for that temperature. It is not expected that the temperature will change a lot while the mobile unit stays turned on, and it may change by four temperature sensor 160 units, or one index (approx. 2° C.) in the TCT array, when the mobile unit enters a traffic channel or leaves the traffic channel and enters a paging channel. Otherwise, there should be no sudden changes in the temperature, and the array TA[n] of size 5 should be sufficient to represent the temperature trend. The searcher algorithm allows the temperature to change by at most 8 temperature sensor 160 units to still be able to use the improved (i.e. faster) stage sequence with limited frequency error resolution (reduced frequency error), and uses averaging with the closest earlier observed frequency error estimate. Otherwise, the searcher algorithm uses the regular stage sequence which can tolerate high frequency error resolution (frequency offset sensitivity) (larger frequency offset errors).

While this invention has been described with reference to its presently preferred embodiments, its scope is only limited insofar as defined by the following set of claims and all equivalents thereof. It should be understood that the above description has been given purely by way of a non-restrictive example. Those skilled in the art will appreciate that various adaptations and modifications of the described preferred embodiments can be configured without departing from the scope and spirit of the invention. Therefore, it is to be understood that, within the scope of the appended claims, the invention may be practiced otherwise than as specifically described herein.

What is claimed is:

1. A method of estimating local oscillator frequency error over temperature in a mobile phone, comprising the steps:
   defining a temperature compensation table having locations for storage of a frequency error entry for each of a plurality of temperature settings;
   defining a temperature array, containing less elements than the temperature compensation array, having a plurality of locations for the storage of recent frequency error readings corresponding to temperature settings;
   measuring periodically a frequency error of a mobile phone local oscillator and a temperature of the mobile phone;
   writing the value of the measured frequency error into the temperature compensation table;
   writing the value of the measured frequency error into a least current location in the temperature array or preferably into a location within the temperature array corresponding to the same temperature if said location exists;
   estimating the local oscillator frequency error at a particular temperature to be a frequency error saved in the temperature array at the particular temperature if that temperature entry exists in the temperature array; and
   if the particular temperature does not exist in the temperature array
       estimating the local oscillator frequency error at the particular temperature to be a weighted sum of the frequency error stored in the temperature compensation table at the particular temperature plus the frequency errors in the temperature array at temperatures within a predetermined distance from the particular temperature.

2. The method of claim 1 further comprising the step:
   initializing all values in the temperature array to zero each time the mobile phone is powered on.

3. The method of claim 1 wherein the rate of measuring the local oscillator frequency error and temperature is essentially 30 seconds.

4. The method of claim 1 wherein the temperature compensation table has locations for 64 frequency error entries.

5. The method of claim 1 wherein the temperature array has locations for five temperatures and five corresponding frequency error readings.

6. The method of claim 1 wherein the predetermined distance used in the weighted sum is two units.

7. A temperature compensated pilot searcher, comprising:
   a temperature sensor for measuring the temperature of a mobile phone;
   means for periodically measuring the frequency of a mobile phone local oscillator;
   a temperature compensation table for storing the measured local oscillator frequencies corresponding to the measured mobile phone temperature;
   a temperature array of lesser size than the temperature compensation table for storing the measured local oscillator frequencies corresponding to the measured mobile phone temperature;
       wherein a most recent measured frequency overwrites a first location corresponding to the same temperature if said first location exists or wherein the most recent measured frequency and a most recent measured temperature overwrite corresponding oldest locations of frequency and temperature if said first location does not exist;
   means for calculating an estimated frequency at an arbitrary temperature based upon the previously saved values in the temperature compensation table and the temperature array;
       wherein the estimated frequency is equal to a frequency value in the temperature array at the arbitrary temperature if that location exists or wherein the estimated frequency is equal to a weighted sum of a frequency value in the temperature compensation table at the arbitrary temperature plus the frequencies in the temperature array at temperatures within a predetermined distance from the arbitrary temperature;
   a plurality of pilot searcher stages;
   means for activating one of the plurality of pilot searcher stages based upon the estimated frequency.

8. A method of choosing a pilot searcher stage within a wireless communication device comprising:
   measuring a current temperature;
   estimating a local oscillator frequency at the measured temperature, the estimating involving:
       (a) defining a temperature compensation table having locations for storage of a frequency entry for each of a plurality of temperature settings;
       (b) defining a temperature array, containing less elements than the temperature compensation array, having a plurality of locations for the storage of frequency readings corresponding to temperature settings;
       (c) measuring periodically a frequency of a local oscillator and a device temperature;
       (d) writing the value of the measured frequency into the temperature compensation table;
       (e) writing the value of the measured frequency into a least current location in the temperature array or into a location within the temperature array corresponding to the same temperature when the location exists;
       (f) estimating the local oscillator frequency at a particular temperature to be a frequency saved in the temperature array at the particular temperature when that temperature exists in the temperature array; and
       (g) when the temperature does not exist, estimating the local oscillator frequency at the particular temperature to be a weighted sum of the frequency stored in the temperature compensation table at the particular temperature and the frequencies in the temperature array at temperatures within a predetermined distance from the particular temperature;
   calculating a frequency error based upon the estimated local oscillator frequency and a predetermined receive frequency; and
   choosing one of a plurality of pilot searcher stages based upon the value of the calculated frequency error.

* * * * *